United States Patent Office 3,437,535
Patented Apr. 8, 1969

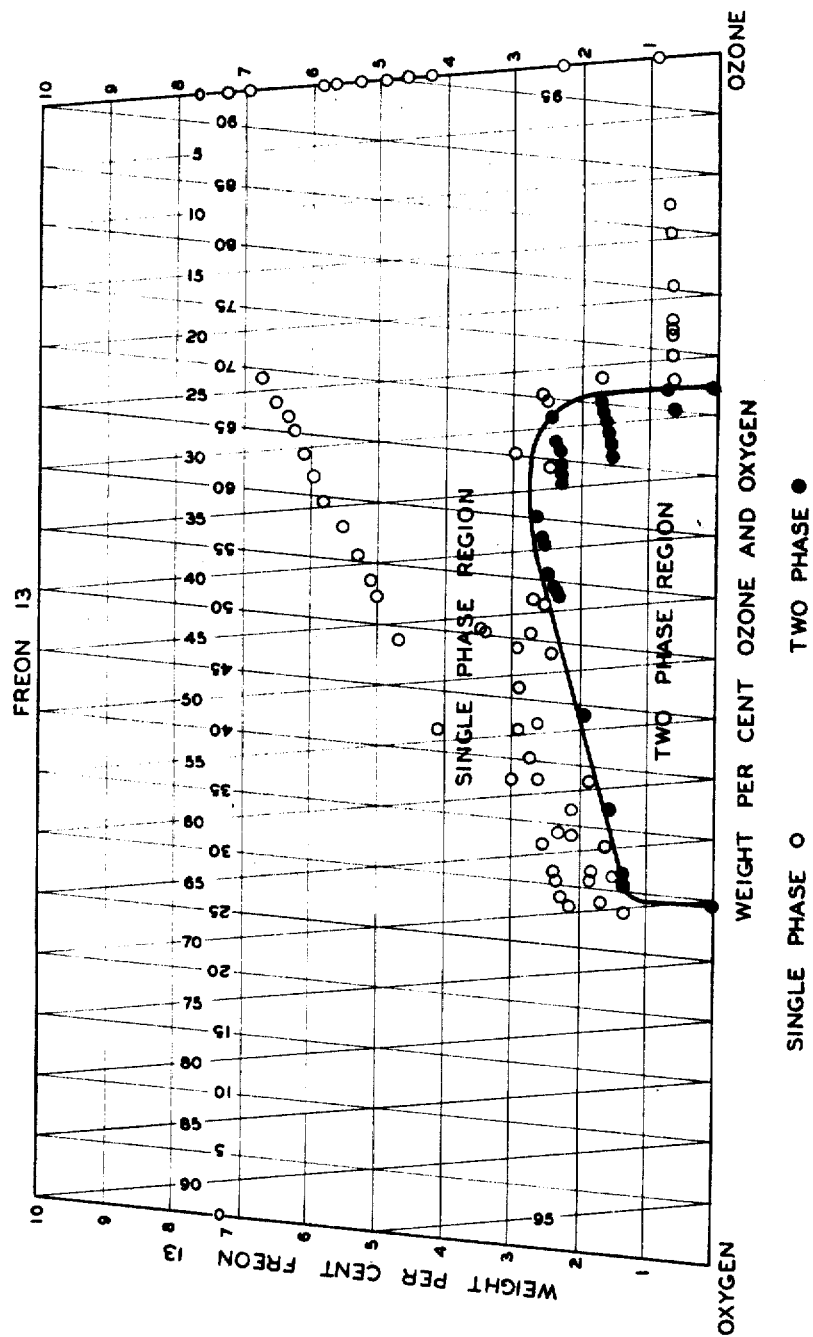

3,437,535
GASEOUS OZONE, OXYGEN MIXTURE
STABILIZED WITH MONOCHLOROTRI-
FLUOROMETHANE
Gerald M. Platz, Elmhurst, Ill., assignor, by mesne assignments, to Air Reduction Company, Incorporated, New York, N.Y., a corporation of New York
Filed Sept. 15, 1955, Ser. No. 534,879
Int. Cl. C06c 15/00
U.S. Cl. 149—109                                      1 Claim This invention relates to the storage, handling and utilization of ozone. In one aspect the invention relates more particularly to the storage and handling of ozone-oxygen mixtures at −183° C., the boiling point temperature of liquid oxygen at atmospheric pressure. In another aspect the invention relates more particularly to safely increasing concentrations of ozone or to rendering more safe presently utilized concentrations of ozone.

In the past, the storage of liquid mixtures of ozone and oxygen at −183° C. was limited to ozone concentrations of less than about 29.8% such as 25% because, when ozone constitutes between about 29.8 and 72.4 weight percent of the liquid mixture, the mixture separates into a light phase and a heavy phase or two layers. Below and above these concentrations, the mixtures do not separate into two layers of different compositions. The heavy phase contains 72.4 weight percent ozone which exceeds the present safe limit for the handling of ozone-oxygen mixtures because of the recognized relative instability of ozone. The light phase contains 29.8 weight percent of ozone. By evaporation of oxygen a homogeneous liquid mixture of 25 weight percent ozone in oxygen in an open container will, over a period of time, be concentrated in ozone to the point where ozone constitutes 29.8 weight percent. At this point, the two phase system is established having the heavier, ozone-rich, bottom layer.

In the prior known methods for the storage of a liquid mixture of ozone and oxygen at −183° C., it was therefore required that the storage be effected so that the ozone does not concentrate by evaporation of oxygen to about 29.8 weight percent ozone or that the storage be done so that, if the ozone does so concentrate, the mixture is suitably disposed of. Thus, the known storage methods at −183° C. have the disadvantages of requiring means for preventing concentration or of requiring means including monitoring devices for disposal of the ozone-concentrated mixture. The above-described phase separation also obviously prevents the establishment and maintenance of single phase ozone-oxygen mixtures in the range of ozone concentrations of between 29.8 and 72.4 weight percents. Since liquid ozone-oxygen has utility as a rocket fuel oxidant, it is desirable that the above-mentioned problem be overcome.

A primary object of the instant invention is to provide the means for eliminating the formation of two separate phases of liquid ozone-oxygen at −183° C. whereby it becomes feasible to store and handle at −183° C. liquid ozone-oxygen having an ozone concentration appreciably in excess of 25 percent ozone.

A further object is to provide the means which permits an evaporation loss of oxygen from a liquid mixture of about 25 weight percent ozone-in-oxygen at −183° C. without causing a two phase separation.

A further object is to provide the means for making and maintaining single phase liquid mixtures of ozone and oxygen with the ozone exceeding 29.8 weight percent at −183° C.

Other objects of the invention, although related to the above objects, are more directly concerned with inhibiting ozone from decomposing violently. It has been determined that a gaseous ozone concentration of less than 20 weight percent in gaseous oxygen will not decompose in a low velocity self-sustaining manner when a high voltage spark is passed through the mixture. In view of this determination, it is considered that gaseous ozone-in-oxygen concentrations of less than 20 weight or 14.3 volume percent of ozone at atmospheric temperature and pressure are very safe since the initiating-decomposition effect produced by a high voltage spark is seldom encountered in conventional ozone handling practices. Similar considerations exist with reference to liquid mixtures of ozone and oxygen although higher ozone concentrations are permissable due to the lower energy level at the temperatures involved and the energy absorption capacity. It was determined that decomposition of a homogeneous liquid ozone-oxygen mixture did not occur when the mixture was subjected to a high voltage spark if the concentration by weight of the ozone was less than 48%. Such a single phase or homogeneous mixture can be obtained by maintaining the mixture above its consolute temperature (−180° C.) and the corresponding pressure. Since ozone-oxygen mixtures have utility as a rocket propellant and since ozone is an excellent oxidant and reagent for chemical reactions, it is also desirable that the hazards due to decomposition be minimized and that the safe concentrations of ozone be increased.

A further important object of the present invention is the provision of means for reducing the tendency of ozone to decompose rapidly whereby the percentage of ozone in a given volume, gaseous or liquid, can be increased without the hazard of self-sustaining or violent decomposition.

The accomplishment of the above objects and others, along with the features and advantages of the invention, will be apparent from the following description and the accompanying drawing which shows the ternary plot of ozone, oxygen, and Freon 13 (a tradename for CClF$_3$ or monochlorotrifluoromethane) at −183° C. and atmospheric pressure. All references herein to the proportions of oxygen, ozone and Freon 13 are by weight percentages at standard temperature and pressure unless otherwise stated. In the interest of safe practice, it is usually preferable that the ozone-oxygen mixtures herein referred to be devoid of hydrocarbons or other sensitizing substances (see U.S. Patent No. 2,700,648) and that they not be contaminated by the handling apparatus.

The instant invention accomplishes the foregoing object of avoiding the separation of liquid ozone-oxygen mixtures into two liquid phases at −183° C. by the addition of Freon 13 in small amounts to liquid ozone-oxygen mixtures maintained at −183° C. This addition prevents the above-described separation and maintains a homogeneous, single-phase three component system over the previously mentioned two-phase range of ozone-oxygen concentrations. This aspect of the invention will be described first after briefly describing the inhibition aspect of the invention.

The instant invention accomplishes the forgeoing objects of reducing the tendency of ozone to decompose violently and of increasing the safe ozone concentrations (1) by the addition of Freon 13 to gaseous mixtures or to single-phase liquid mixtures, as occurs with a liquid mixture above −180° C. or (2) at −183° C. by the addition of Freon 13 in accordance with the minimum quantities shown on the accompanying chart or somewhat in excess of these chart quantities.

The aforementioned phase separation in the two component system of ozone and oxygen is apparent from the bottom boundary of the chart on the accompanying drawing. When the ozone concentration increases (right to left) to about 29.8 percent in oxygen by weight, the two layers form and continue to exist until about 72.4 percent ozone concentration is reached, at which point a single phase homogeneous solution again results but which is too concentrated for maximum safety. A single phase also exists, of course, with an ozone concentration of less than 29.8 percent. In one instance this phase separation was noticed two days after a 25 weight percent ozone in oxygen was placed in an open tube and had concentrated by evaporation of oxygen. At initial phase separation, the bottom ozone-rich layer constitutes only a small fraction of the total volume. However, at an average ozone concentration of 35%, the upper layer will comprise 87.5 volume percent of the mixture while the lower ozone-rich layer will make up 12.5 volume percent. Handling of concentrations approximating that of the lower layer (72.4% ozone) is hazardous and must be avoided because of the violence of instantaneous decomposition whch may result from the input of energy.

After investigations proved that Freon 13 was miscible in liquid ozone over a wide range of concentrations and was similarly miscible with liquid oxygen, it was discovered in a preliminary test that 10 weight percent Freon 13, 45 weight percent ozone, and 45 weight percent oxygen formed a single phase system at −183° C. and atmospheric pressure. Thereafter, a systematic investigation was made in order to discover the minimum amount of Freon 13 which was necessary to eliminate the two phase region. The results are shown in the ternary chart of the accompanying drawing. In the chart, the Freon 13 concentration ordinate is enlarged to show more clearly the single and two phase regions, above and below respectively, the heavy black line. The ternary chart or pilot in the accompanying drawing shows the amount of Freon 13 (white circles immediately above the black line) required to maintan a single phase, homogeneous system with varying percentages of ozone and oxygen. The plotted data, derived from tests, shows that, at the two phase limits of the ozone-oxygen system at −183° C. (about 29.8 and 72.4 weight percent ozone in oxygen), the two phasing is not overcome until respectively about 1.5 and about 2.8 percent Freon 13 has been added to the mixtures near the respective limits. The points just above the phase separation line on the chart, record what happened when oxygen evaporates from an initial mixture of 1.50 weight percent Freon 13 in 31 weight percent ozone in oxygen. It is apparent that the initial weight of Freon 13 constitutes an increasing percentage as does the ozone when oxygen evaporates. By reference to the chart, it can be seen that a 38 percent concentration of ozone requires about 1.9 percent Freon 13, a 45 percent concentration requires about 2.3 percent Freon 13, and a 65 percent concentration requires about 2.8 percent Freon 13. Thus, if it is desired to handle an ozone concentration in the range of about 73 percent to 28 percent, it is feasible to do so over the entire range and with an appreciable excess of Freon 13 over the lower part of the range, if the Freon 13 constitutes about 3 percent by weight of the total weight. To safely protect against phase separation by evaporation, a mixture of 25 weight percent ozone must contain a minimum of 1.25 weight percent Freon 13 at −183° C. Thus, assuming evaporation of 20 parts of the oxygen of the last-mentioned mixture, there will be 1.25 parts Freon 13, 25 parts ozone and 53.75 parts oxygen which gives a total parts quantity of 80 and percentages of 1.56 weight percent Freon 13, 31.25 weight percent ozone and 67.19 weight percent oxygen. This percentage of Freon 13 at this ozone concentration prevents phase separation, as is apparent from the chart.

The above-described prevention of the separation into two phases at −183° C. by the addition of Freon 13 greatly simplifies handling, storage and transportation of ozone-oxygen and permits the use of 25 weight percent ozone at −183° C. in applications where evaporation of oxygen may occur. Furthermore, it is possible to use with greater safety, higher concentrations of ozone at −183° C. as will be described in more detail hereinafter. It is apparent that the instant invention eliminates the possibility of formation of two separate phases of a liquid ozone-oxygen mixture, thereby insuring the maintenance of a homogeneous solution at −183° C. It is also apparent that the transfer of a given composition of ozone and oxygen within the previous two phase range at −183° C. is greatly facilitated, because, like an emulsified oil-water mixture, the mixture will not mechanically separate into two phases.

Most of the described mixtures of ozone, oxygen and Freon 13 were prepared by making up an oxygen-Freon 13 mixture, as a gas, and then adding it to 100 percent ozone by bubbling it through the liquid ozone. However it is preferred that Freon 13 be condensed in liquid oxygen before condensing ozone. Other well-known methods of making the mixture with agitation can be used. The oxygen used in these tests was purified of any trace of hydrocarbons and the ozone was made from such oxygen and distilled in order to obtain 100 percent pure ozone. The Freon 13 used in all of the above-described tests was commercial grade, with no attempt to purify it other than the single distillation required to introduce it into the test apparatus. A density of 1.94 g./ml. was used for Freon 13 at −183° C. in determining the data set forth above.

It has been determined that the problem of phase separation does not occur above about −180° C. It was observed that a rapid increase in mutual solubility with temperature increase occurred and that there was no phase separation at about −180° C., which is the critical solution temperature (consolute temperature). Thereafter, it was discovered that the above-mentioned liquid mixture of 45 weight percent ozone, 45 weight percent oxygen and 10 weight percent Freon 13 at a temperature of −183° C. was homogeneous throughout. When the temperature of this mixture was lowered to −196° C., an immediate separation of the mixture into two distinct phases or layers occurred. In fact Freon 13 is ineffective below −186° C. From the foregoing tests and other test data, it is apparent that the temperature of −183° C. is limiting as to the two phase feature of the instant invention and yet convenient, since −183° C. is the boiling point of liquid oxygen at atmospheric pressure. The attempts to eliminate the two phase system at −196° C. probably were not successful because Freon 13 possesses a very low degree of solubility at this temperature and tends to freeze out below −186° C. It is to be noted that Freon 13 can be readily supercooled without solidification below its reported freezing point of −181° C. The use of nitrogen as a third component at −196° C. was found to be ineffective.

As above-mentioned, the instant invention also has as an object the provision of means for increasing of ozone concentrations which can be handled with maximum safety. Since other tests showed that a homogeneous liquid mixture of ozone-oxygen containing 48 weight percent ozone and at −180° C. or above would not decompose when subjected to a high-voltage spark, it is apparent that Freon 13 since it does not sensitize permits an increase in ozone concentration in a liquid mixture at −183° C. merely by preventing the separation into two phases, one of which would contain a hazardous 72.4% ozone concentration. The spark limit of 48% was determined by tests in which the mixture was above the consolute temperature (about −180° C.) and at the corresponding pressure, such as −165° C. and 15 p.s.i.g., so that phase separation did not occur. Thus, by functioning only to prevent phase separation at −183° C., the Freon 13 addition provides for increasing at −183° C. the ozone concentration which can be handled with maximum safety since concentrations up to about 46% of the total or 48% ozone in oxygen, rather than 29.8%, can be made at −183° C. without separation into two phases. This increase in ozone concentration is easily achieved by merely mixing, at −183° C., 3 parts Freon 13 with 28–46 parts ozone and 69–51 parts oxygen.

In addition to the foregoing "physical" method of increasing ozone concentration to about 48% in liquid ozone-oxygen mixtures at −183° C., the instant invention provides a positive inhibition effect on the tendency of ozone to decompose, independent of any phase separation. It was discovered that a homogeneous liquid mixture of ozone and oxygen at higher temperatures could contain more than about 48% ozone if a proper amount of Freon 13 was present and could not be detonated by a high-voltage spark. Thus, when liquid ozone-oxygen was maintained above −180° C. or preferably about −165° C. and under the corresponding pressures in order to maintain a single phase, a small amount of Freon 13 (about 1% by weight) permitted a safe increase in ozone concentration to above 48 weight percent and hence had an inhibition effect on decomposition. It was also discovered that, at a temperature of −183° C. and atmospheric pressure, Freon 13 inhibited decomposition as well as prevented phase separation as above described. For example, a liquid composition of about 65.8% ozone, 5.55% Freon 13 and 28.65% oxygen was sparked three hundred and ninety-four times without detonation. A mixture of 66.2% ozone, 3.97% Freon 13 and 29.83% oxygen also was not detonated by submerged sparks. When just enough Freon 13 (about 3%) was used to prevent phase separation, it was also determined that the three component mixture was resistant to spark-initiated decomposition and can be handled with a reasonable margin of safety. It is apparent that the addition of 4–6% Freon 13, acting simultaneously as an homogenizer and a stabilizer, extends inertness to decomposition by submerged spark initiation to a concentration of about 66% (or about 70% ozone in oxygen if the weight of Freon is ignored). In another test is was proved that a two component mixture of 57.6% ozone and 42.4% Freon 13 did not detonate when subjected to submerged spark. It is to be appreciated that, when a mixture is not detonated by submerged spark, maximum safety is achieved because the spark-energy equivalent is seldom encountered with the usual precautions in handling.

Other tests were made with the liquid ozone, oxygen and Freon 13 under pressure and at −183° C. It was determined by submerged spark tests that 45% ozone, 4–6% Freon and the remainder being oxygen is not detonated as long as the pressure does not exceed 400 p.s.i.g. These tests also established that 42% ozone in oxygen stabilized with 5% Freon 13 will not sustain a spark-initiated decomposition even at pressures as high at 1400 p.s.i.g. This data shows the regions of safe operation for pressurized tanks, lines, and pumps in rocket equipment.

Gaseous mixtures of ozone, Freon 13 and oxygen were also tested for the inhibition effect of Freon 13. These tests also proved the inhibition effect of Freon 13 since a small amount of Freon 13 will give a beneficial effect.

As above mentioned, the spark decomposition testing of gaseous mixtures of ozone and oxygen established a spark limit of about 14.3 volume percent. When Freon 13 was added and the amount of ozone was increased until the point where no oxygen was present, ozone constituted about 19.8 volume percent at the spark resistant limit. When the Freon 13 and oxygen constituted equal parts by volume, the decomposition limit shifted to 17 volume percent ozone which is midway between the standard of 14.3 volume percent and 19.8 volume percent, the maximum safe limit for this gaseous mixture. Tests also established that, when the ozone concentration was above 19.8 volume percent, a range of partial decomposition for various proportions of ozone in Freon 13 exists. For example, with a mixture of about 26.5 volume percent ozone and about 73.5 volume percent Freon 13 being subjected to a high-voltage spark, about 50% of the ozone decomposed. The concentration of ozone at which there was 100% decomposition was 34 volume percent. The percentage of ozone decomposition of ozone-Freon 13 mixtures between the spark limit (19.8 volume percent) and the 100% decomposition point (34%) is a straight line relation. It is to be noted that the maximum ozone percentage increase in gaseous ozone concentration is as large as the liquid increase, although much more Freon 13 is necessary. Freon 13 as a gas obviously is useful as a circulating gaseous carrier for the ozone. Furthermore it was noted that if a small but effective amount (about 5% by volume) of Freon 13 is admixed with gaseous ozone and oxygen, there was a minimization of any tendency of an unstable ozone concentration to decompose violently due to the addition of energy.

With reference to liquid mixtures and in summary, it is to be appreciated that, by forming a three component system of ozone, oxygen and Freon 13 at −183° C. and proportioning the mixture so that the ozone constitutes about 25 weight percent and the Freon 13 constitutes about 1.25 weight percent, the prior hazard resulting from oxygen evaporating and then forming a two phase system at a 29.8 percent ozone concentration is eliminated. It is also apparent that liquid mixtures of ozone and oxygen containing more than 25 weight percent ozone but less than about 46 weight percent can be stored or handled at −183° C. with a maximum safety factor, provided Freon 13 constitutes in direct proportion to the ozone about 1.5–2.8 weight percent of the total weight of ozone, oxygen and Freon 13. Also at −183° C. and atmospheric pressure, if the Freon 13 constitutes about 4–6%, a mixture composition of 46–66 parts ozone, 4–6 parts Freon 13 and the remainder oxygen can be made which is very safe. If the Freon 13 constitutes about 3%, it is possible to have a mixture of 3% Freon 13, 29–66% ozone and the remainder oxygen and this mixture will have a reasonable margin of safety. It is also apparent that, if the mixture is homogeneous as when above −180° C., a small but effective amount (about 1%) of Freon 13 will provide a margin of safety when it is desired to handle more than about 46 weight percent ozone. In the handling of liquid ozone-oxygen at elevated pressures, it is apparent that a high degree of safety can be achieved if a liquid mixture of 5% Freon 13, 42% ozone and 53% oxygen by weight is made and the maximum pressure in the handling is limited to less than 1400 p.s.i.g. The ability of Freon 13 to insure the maintenance of homogeneous liquid mixtures at any ozone concentration greatly reduces the complexity of the handling procedures and apparatus. A further benefit is that Freon 13 acts as a decomposition inhibitor thereby diminishing the hazard of handling unstable concentrations of liquid ozone in oxygen.

While specific embodiments of the invention have been described, it will be understood that changes may be made by those skilled in the art without departing from the invention as set forth in the following claim.

I claim:
1. A stabilized gaseous mixture consisting essentially of ozone, oxygen and monochlorotrifluoromethane, at least about 14.3 volume percent of said ozone, oxygen mixture being ozone and at least about 5 volume percent of the total mixture being monochlorotrifluoromethane.

References Cited

UNITED STATES PATENTS

| | | | |
|---|---|---|---|
| 2,584,803 | 2/1952 | Hannum | 52—0.5 |
| 2,876,077 | 3/1959 | Haller | 23—222 |

FOREIGN PATENTS 729,010   4/1955   Great Britain.

OTHER REFERENCES

"Journal of the American Rocket Society" No. 72, pp. 14, 20, 21, 22. December 1947.

Thorp: "Bibliography of Ozone Technology," vol. 2, p. 3047, John S. Swift Co., Inc., Chicago, Ill., 1955.

LELAND A. SEBASTIAN, *Primary Examiner.*

U.S. Cl. X.R.

149—1; 252—186